(12) United States Patent
Steinke et al.

(10) Patent No.: US 7,294,050 B2
(45) Date of Patent: Nov. 13, 2007

(54) LOOP APPLICATOR FOR CHUB MACHINE

(75) Inventors: Gary L. Steinke, Bettendorf, IA (US); Ricky G. Franks, Moline, IL (US)

(73) Assignee: Packaging Technologies, Inc., Davenport, IA (US)

( * ) Notice: Subject to any disclaimer, the term of this patent is extended or adjusted under 35 U.S.C. 154(b) by 0 days.

(21) Appl. No.: 11/558,567

(22) Filed: Nov. 10, 2006

(65) Prior Publication Data

US 2007/0084143 A1    Apr. 19, 2007

Related U.S. Application Data

(62) Division of application No. 10/833,521, filed on Apr. 28, 2004, now Pat. No. 7,134,955.

(51) Int. Cl.
    *A22C 11/00*    (2006.01)
(52) U.S. Cl. .................................................. 452/48
(58) Field of Classification Search ............ 452/30–32, 452/46, 48, 51; 29/771, 773, 779, 788, 818, 29/243.56, 243.57; 53/134.1, 139.4, 450, 53/451, 501–504, 55, 138.1–138.4, 416–418, 53/550–552, 409, 452, 467–469, 423–426, 53/480, 235, 248–250, 264, 266.1, 268, 287
See application file for complete search history.

(56) References Cited

U.S. PATENT DOCUMENTS

| | | | |
|---|---|---|---|
| 4,165,593 A * | 8/1979 | Niedecker | 53/413 |
| 4,324,086 A * | 4/1982 | Niedecker | 53/134.1 |
| 4,370,778 A * | 2/1983 | Madsen | 452/48 |
| 4,479,283 A | 10/1984 | Hollingsworth | |
| 4,516,267 A | 5/1985 | Kent et al. | |
| 4,694,537 A * | 9/1987 | Kollross | 452/48 |
| 4,720,010 A | 1/1988 | Bertram | |
| 4,766,713 A | 8/1988 | Evans | |
| 4,939,885 A | 7/1990 | Steinke | |
| 4,991,260 A | 2/1991 | Nausedas | |
| 5,046,219 A | 9/1991 | Stanley | |
| 5,067,313 A | 11/1991 | Evans | |
| 5,159,798 A | 11/1992 | Hannon | |
| 5,165,216 A * | 11/1992 | May et al. | 53/413 |
| 5,203,759 A | 4/1993 | Torres et al. | |
| 5,209,041 A | 5/1993 | Evans | |
| 5,238,444 A | 8/1993 | Schwimmer et al. | |
| 5,241,800 A * | 9/1993 | Steinke et al. | 53/55 |
| 5,269,116 A | 12/1993 | Roberts et al. | |
| 5,755,022 A * | 5/1998 | Whittlesey | 29/788 |
| 6,119,438 A * | 9/2000 | Bacon et al. | 53/451 |
| 6,622,459 B1 * | 9/2003 | Sarria Sanchez | 53/450 |

* cited by examiner

*Primary Examiner*—Thomas Price
(74) *Attorney, Agent, or Firm*—Wood, Herron & Evans, LLP

(57) ABSTRACT

An apparatus for attaching a loop to the end of a chub package formed by a chub machine. The apparatus includes a drive sprocket and variable speed drive motor for feeding a roll of loops to a clipping head assembly of the chub machine and positioning the loops sequentially for capture by the wire to be cinched around one end of the chub package. A chub machine incorporating the loop attachment apparatus is provided for forming chub packages have a loop attached under the clip at one end of each package. A method for attaching the loop to chub packages is also provided.

8 Claims, 5 Drawing Sheets

LOOP APPLICATOR FOR CHUB MACHINE

CROSS REFERENCE TO RELATED APPLICATIONS

Pursuant to 37 C.F.R. §1.78, this application claims the benefit of and priority to prior filed application Ser. No. 10/833,521, filed Apr. 28, 2004 now U.S. Pat. No. 7,134,955, which is expressly incorporated herein by reference.

FIELD OF THE INVENTION

This invention relates to an apparatus and method for feeding a loop or tie in a clip attachment apparatus, also referred to as a chub machine.

BACKGROUND OF THE INVENTION

Chub machines are well known in the packaging industry, and can be used for many flowable or extrudable materials. For example, various edible products such as ground meat, cheese, liver sausage, butter, ice cream and cookie dough have been packaged utilizing the chub machines. Inedible products have also been packaged utilizing the chub machines, including explosives.

In operation, a chub machine continuously unwinds and forms a tube from a roll of film, fills the tube with a flowable material, gathers or constricts at regular intervals short lengths of the filled tubing, applies a pair of closure clips to each gathered length of tubing, and severs the gathered or constricted material between the individual clips in a pair thereof. In one type of chub machine, two strands of wire from coils or reels are unwound and cut off at predetermined lengths from the ends of the wires so as to provide the clips, which are then suitably formed and constricted in pairs to each gathered length of tubing. In another type of chub machine, preformed clips are used.

The primary operating components or elements of a chub machine are: the tube-forming mechanism whereby a web of film is withdrawn from a supply roll, folded over around a hollow mandrel into a tube and heated or otherwise sealed; a product metering pump which injects flowable product through the mandrel out into the tube; a tube or film feed mechanism which continuously feeds the tube over and away from the mandrel; a voider which flattens or collapses short lengths of the filled tube at predetermined intervals; and a clipping head which applies a pair of spaced clips to the voided and gathered tube and severs the tube intermediate the clips. These operating components or subassemblies may be manually operated, or the chub machines may be provided with automatic control and monitoring systems, such as that set forth in U.S. Pat. No. 5,241,800 to Steinke et al., incorporated by reference herein in its entirety.

An example of a chub machine having automatic control is provided in FIG. 1. The chub machine, as indicated generally at 5, will be recognized by those familiar with chub machines as having a film arbor 6, a mandrel 7, a tube seam overlap heat sealer 8, a product delivery pump 9, a film drive 10, a voider 11, a clipping head assembly 12, a wire feed/cut-off assembly (not shown) carried by the clipping head, and a drive mechanism (not shown) housed in the base 13 of the machine. As is well known to those familiar with chub machines, conventionally, a web 14 of packaging film is continuously withdrawn from the arbor 6 when the machine 5 is in operation. The web 14 is led to a film folder 15 where the film is folded and its side edges overlapped thereby forming the web into a tube surrounding the mandrel 7. The sealer 8 acts to heat seal or otherwise bond the overlapped edges thereby completing the formation of a continuous tube. The film drive 10 engages the exterior of the tube and serves to continuously feed the tube downwardly. Below the film drive mechanism 10 the tube receives a metered quantity of flowable product through the mandrel 7. On passing through the voider 11 the voider rolls, at predetermined intervals, depending on the length of the packages being formed, momentarily swing inwardly together compressing the product-filled tube and thereby substantially voiding or expelling product from a short length of tube which has been flattened between the voider rolls. Each voided length of the tube is gathered in the clipping head 12 and a pair of vertically spaced clips applied to the gathered tube. The lower clip completes the formation of the upper end of one chub package while the upper clip forms the lower end of the next package. Immediately following the application of the clips a reciprocating knife severs the tube midway between the clips thereby allowing the completed chub package P to exit the machine.

Referring further to FIG. 1, the automatic control and monitoring system comprises: a pump drive servo 20 operatively connected to the product delivery pump 9; a film drive servo 21 is operatively connected to the film drive 10; and a clamp drive servo 22 is operatively connected to the clipping head 12. A machine controller 23 in the form of a microprocessor or computer of known commercial type is a key component of the control and monitoring system.

Inputs to the controller 23 are connected in signal receiving relationship to the servos 20, 21 and 22 and also to the heat sealer 8 and voider 11 as indicated. Three outputs of the controller 23 are connected to three servomotor controls 24, 25 and 26 of known commercial type which are in turn connected in signal delivering relationship to the servos 20, 21 and 22, respectively, as diagrammatically indicated.

Another output of the microprocessor controller 23 is operatively connected to a display 27, which is housed in a custom designed operator interface membrane panel 28. The monitor 27 serves as a computer display which enables the operator to effectively manage high levels of production from the chub machine 5 using easy to read symbolic keys on the membrane panel, multiple language screen displays and memory storage registers for various product operating presets. There may also be included a full range of screen displayed alarms and diagnostics to ensure minimum down time. Thus, the various components of the chub machine, such as the product delivery pump, tube or film feed, film heat sealer, voider and the clamping mechanism of the vertically reciprocating clipping head may all be automatically controlled by means of servo actuators operatively connected to a microprocessor.

It is often desirable to insert a loop or tie under one of the clips of a chub package to support or hang the filled chub package on a rack or hook for further processing, such as smoking, cooking or the like, or for display. It is also desirable to automate the operation of positioning a loop or tie in the pathway of the metal clip prior to application of the clip. Various methods and apparatuses have been designed for accomplishing loop attachment. One such mechanism is disclosed in U.S. Pat. No. 5,755,022, which is incorporated by reference herein in its entirety. Despite these attempts, there remains a need for an improved mechanism for feeding loops to chub packages in a chub machine, including a loop attachment accessory that may be added to an existing chub machine without interfering with the operation of the chub machine.

SUMMARY OF THE INVENTION

The present invention provides a loop attachment apparatus for use with a chub machine for attaching loops to chub packages. To that end, in one embodiment, a variable speed drive motor and a drive sprocket comprising a plurality of drive pins operate to advance a carrier strip having a series of spaced loops attached thereto forward to a clipping head assembly of a chub machine. At the clipping head assembly, each loop is sequentially advanced and positioned to be threaded by one of a pair of advanced wires, either prior to or after formation of the wire into a preformed clip. The loop is thereby captured by the clip upon securing the clip to a gathered portion of a packaging tube to close the tube and thereby form the chub package. A cutting knife is also provided to cut the carrier strip between loops to release each loop as the wire clip engages the loop. The carrier strip is provided with feed holes that mesh with the drive pins to facilitate the registered motion of the carrier strip. In an exemplary embodiment, a sensor is positioned in alignment with the drive pins on the drive sprocket to allow registered feed of the carrier strip and loops via sensor pick-up of the drive pins. In a further exemplary embodiment, a mounting shaft is provided for supporting a roll of the carrier strip and facilitating feed of the carrier strip to the drive sprocket. In yet a further exemplary embodiment, the variable speed drive motor, for example a servomotor, is programmed to over-feed the carrier strip beyond the registered position, and then back the carrier strip up to position the open lead loop in the registered position to allow the wire to pass through the open loop.

The present invention further provides a chub machine including the components of the loop attachment apparatus in addition to means for forming packaging material into a tube and for feeding the tube, means for filling the tube with product, a clipping head assembly with a wire feed and cutting device for applying wire clips to a voided and gathered section of the tube, and a cut-off knife for severing the tube between wire clips. By virtue of the loop attachment apparatus, the chub machine continuously forms chub packages with each having a loop captured by the wire clip at one end of a package or series of packages to enable hanging of the chub packages.

The present invention further provides a method for attaching a loop to a chub packing, including feeding material into a packaging tube, intermittently forming void portions in the tube and gathering the void portions in a clipping head assembly, feeding wire clips to the gathered portion and capturing a loop with one of the wire clips to attach the loop to the end of the chub package as the end is closed off with the wire clip. To enable the loop to be captured by the wire clip, the method further includes feeding a carrier strip having loops attached thereto in registered motion to the clipping head assembly via a servomotor and drive sprocket with drive pins that intermesh with feed holes on the carrier strip and sequentially positioning each loop in a registered position for threading by the wire clip. As the wire clip engages the loop, the carrier strip is cut between that loop and the next spaced loop. In an exemplary embodiment, the method further comprises detecting each drive pin with a sensor and feeding a signal to a controller, such as a PLC, to drive the feed of the carrier strip in registered motion. The method may include feeding wire to the clipping head assembly, threading the wire sequentially through the loops, and then cutting the wire and forming it into clips to be applied to the chub packages. Alternatively, the method may include feeding preformed clips to the clipping head assembly to engage the loops and then close off the chub packages.

Additionally, the present invention includes a method of modifying an existing chub machine to include the loop attachment apparatus and associated benefits of this invention.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

The apparatus, chub machine and method of the present invention provides automated, controlled and efficient attachment of loops under the clips of chub packages to allow vertical hanging of the packages for further processing and display.

Figure 1:
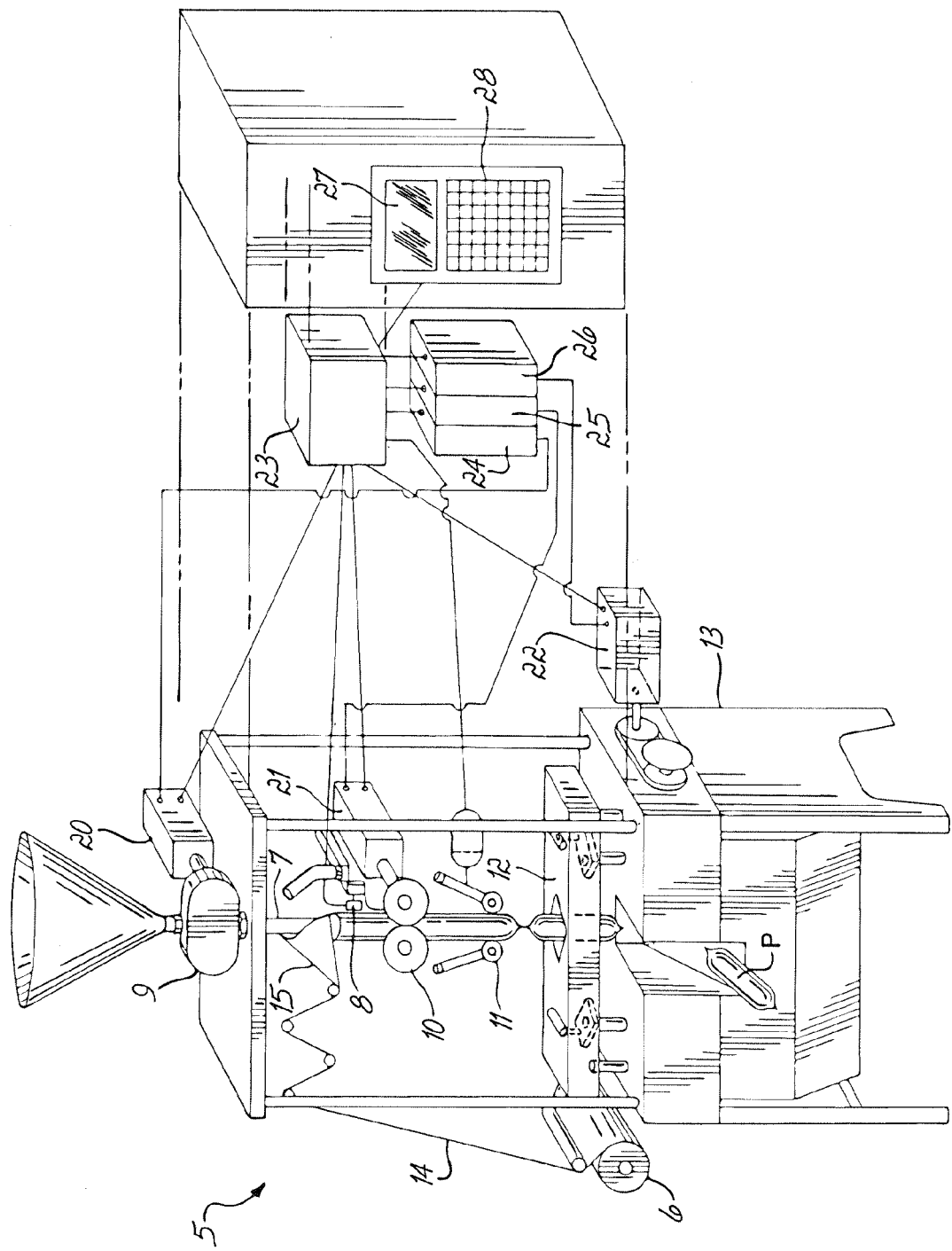
FIG. 1 is a diagrammatic view of a chub machine of the prior art incorporating an automatic control system.
Figure 2:
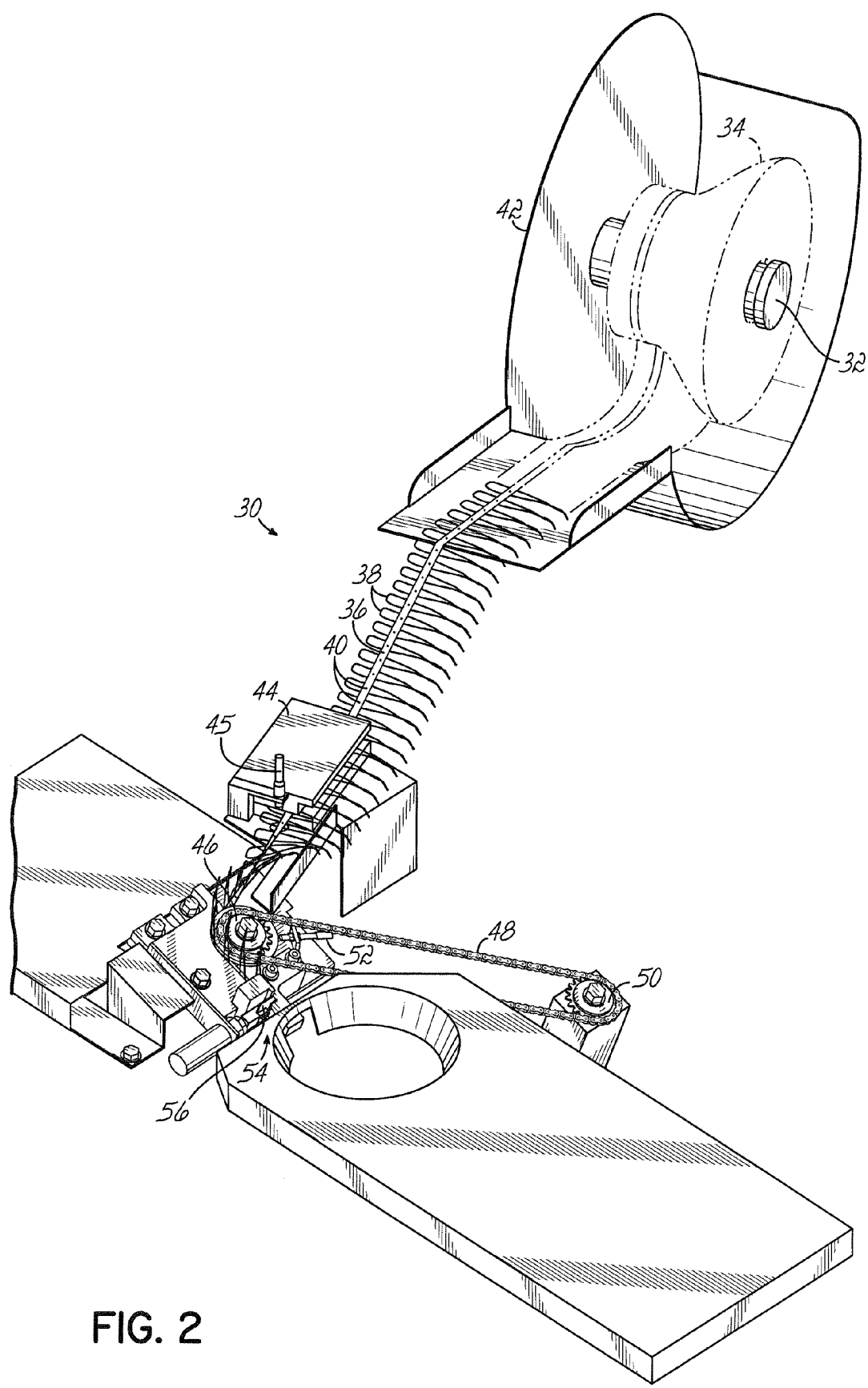
FIG. 2 is a perspective view of a loop attachment apparatus for use with a chub machine in accordance with the present invention.

Referring to FIG. 2, a loop attachment apparatus, generally indicated at 30, is depicted in perspective view for use with a chub machine, such as the type of machine depicted in FIG. 1. Apparatus 30 includes a shaft 32 upon which may be mounted a roll of loops 34 for attachment to chub packages. By way of example, a roll of loops 34 may include a carrier strip 36 having a plurality of loops 38 attached thereto, and advantageously evenly spaced along the carrier strip 36, with each loop positioned in correlation with a feed hole 40. In an exemplary embodiment, an open-ended housing 42 (or canister) is provided with the shaft 32 mounted in the center thereof for mounting the roll 34 and facilitating its feed to the chub machine. The carrier strip 36 is fed through a guide mechanism 44, which may also be adjusted to provide tension to the carrier strip feed. A sensor 45 may also be provided, for example associated with the guide mechanism 44, to sense when the end of the roll 34 has been reached. The carrier strip 36 passes over a drive sprocket 46, which is connected by roller chain 48 to a variable speed drive motor 50. In an exemplary embodiment, the drive motor 50 is a servomotor, which is capable of quick speed changes useful in the present invention. A sensor 52 is positioned to sense advancement of the drive sprocket to enable feed of the carrier strip in a registered motion. Carrier strip 36 is fed from the drive sprocket 46 to a cutting knife assembly 54 for engagement of the carrier strip 36 by a reciprocating knife blade 56 to release a lead loop from the carrier strip 36, as will be described in greater detail below.

Figure 3A:
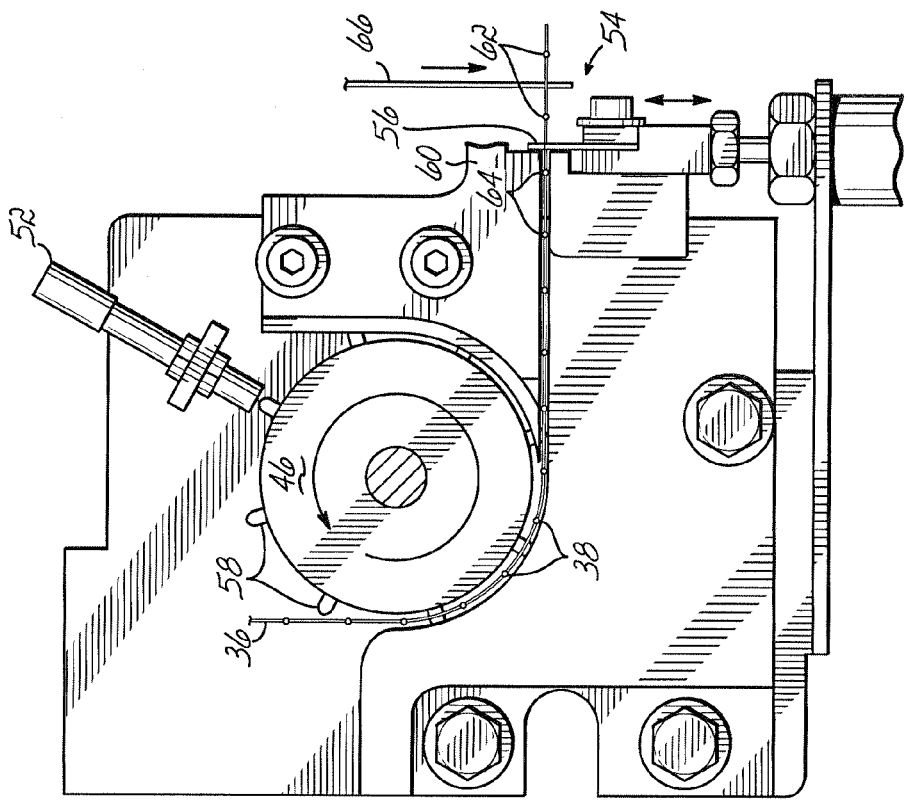
FIG. 3A is a detailed view depicting sensing of the drive pins of the drive sprocket and the cutting knife operation for severing the lead loop from a roll of loops.
Figure 3:
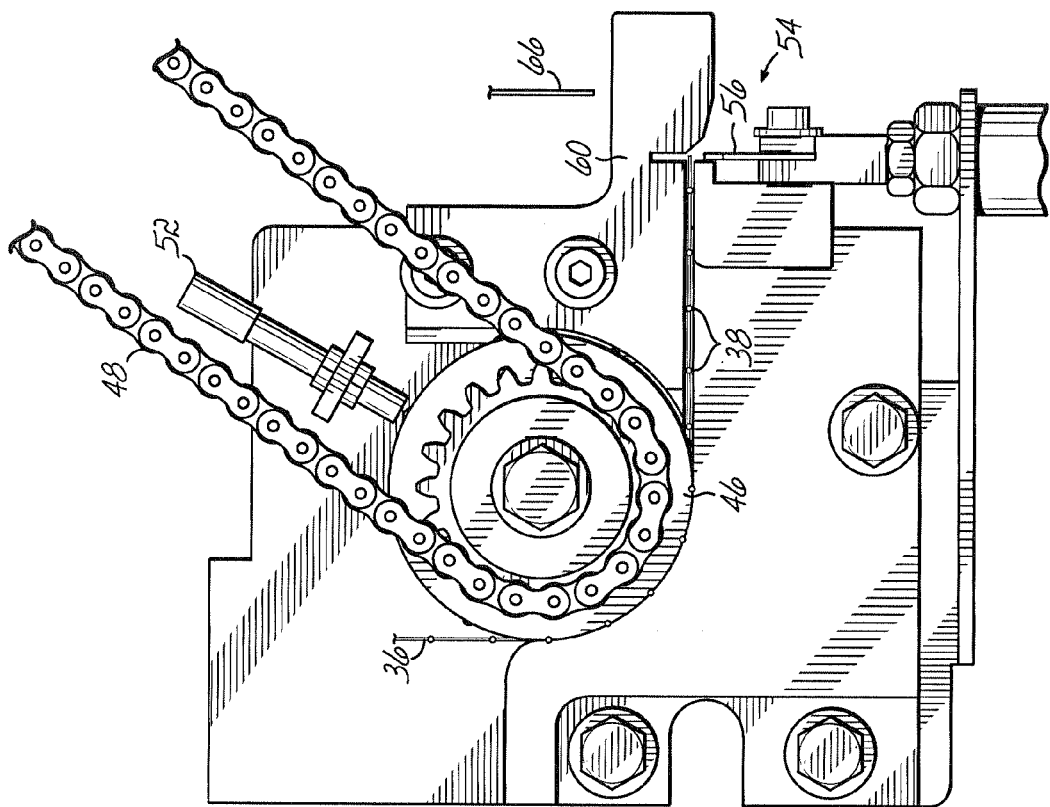
FIG. 3 is a detailed view of the drive sprocket, chain and sensor assembly for the loop attachment apparatus of the present invention.

Referring to FIGS. 3 and 3A, which depict in greater detail the feed and cut mechanisms for the loop attachment, the chain 48 engages the drive sprocket 46 to rotate the drive sprocket, thereby feeding the carrier strip 36 forward. The drive sprocket 46 includes a plurality of drive pins 58 for engaging or intermeshing with the feed holes 40 on the carrier strip 36. FIG. 3A depicts a drive sprocket having 8 drive pins with a 45° net index, though the invention is not so limited. The spacing of the feed holes 40 and of the drive pins 58 should be correlated, as necessary, to ensure engagement of the carrier strip 36 by the drive sprocket 46. Sensor 52 is positioned in alignment with the drive sprocket 46 so as to sense the presence of each drive pin 58 when the pin comes into alignment with the sensor 52 as the drive sprocket 46 is rotated. The drive motor, e.g., servomotor 50 depicted in FIG. 2, and a PLC, e.g., a servo controller (not shown), receive a signal from the sensor 52 that the next successive drive pin 58 is in position, such that the drive sprocket 46 can be advanced in registered motion. In an exemplary embodiment, sensor 45 also detects the end of the carrier strip and signals the controller that the end of the roll 34 has been reached such that the process may be halted to enable a new roll of loops 34 to be mounted on the shaft 32.

The feed holes 40, although not visible in FIGS. 3 and 3A, are engaged by the drive pins 58 to feed the carrier strip 36 forward to the cutting knife assembly 54. The carrier strip 36 is fed into the cutting block 60 to advance a lead loop 62 past the reciprocating cutting knife 56 such that the knife 56 can engage the carrier strip 36 between lead loop 62 and a next successive loop 64 to cut the strip 36 and release the lead loop 62 from the carrier strip 36. Just before the strip 36 is cut, wire 66 is threaded through lead loop 62 to capture the lead loop 62. Thus, upon sensing a drive pin 58, the sensor 52 signals the servomotor 50 and controller (not shown) to pause the rotation of the drive sprocket 46, whereby the motion of the carrier strip 36 pauses briefly as the wire 66 captures the lead loop 62 and as the carrier strip 36 is cut to release the now captured lead loop 62. In an exemplary embodiment, the lead loop 62 on the carrier strip 36 may be overfed and jerked back into the registered position to ensure that the lead loop 62 is open for threading wire 66 therethrough. This may be advantageous for flexible string loops passing through a narrow cutting knife assembly passage where the loop opening may become distorted. The jerking or reverse motion of the carrier strip 36 allows a distorted loop to straighten back to its original open shape in free space for threading by the wire 66. Upon cutting the lead loop 62 free, the drive sprocket 46 is again advanced until the sensor 52 senses the next drive pin 58. Thus, in an exemplary embodiment, each feed hole 40 is aligned with a loop 38 and each feed hole 40 is engaged by a drive pin 58 such that each registered advancement of the drive sprocket 46 represents an advancement of one loop 38.

Figure 4:
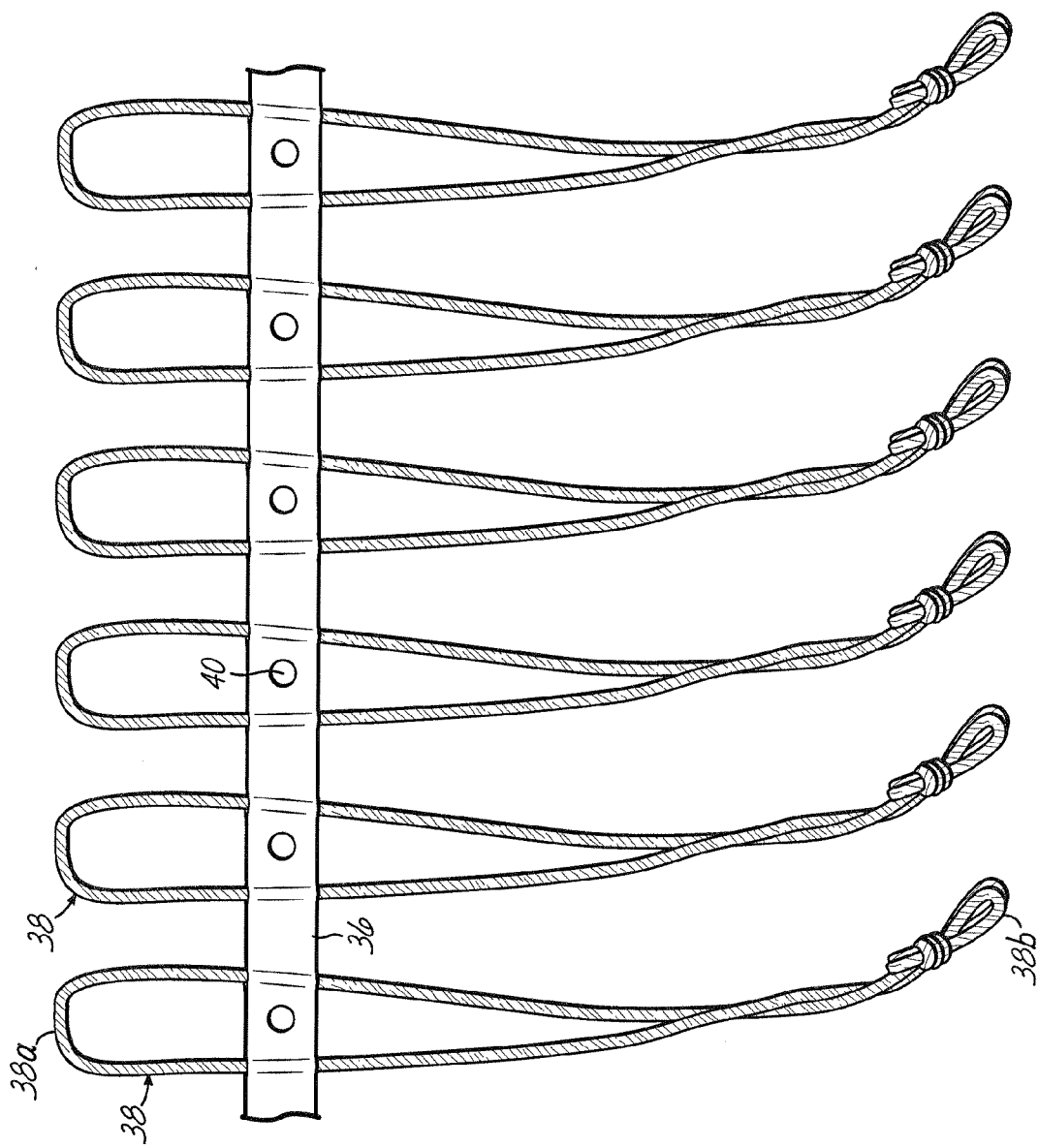
FIG. 4 depicts a portion of a roll of loops attached to a carrier strip for use in the apparatus of the present invention.

As shown in FIG. 4, an exemplary carrier strip 36 may be a two-ply strip that captures the loops 38, such as a corded or string loop, between the plies to position the loops 38 perpendicular to the length and feed direction for the carrier strip 36. Each loop 38 has a loop end 38a and a tie end 38b with the loop being attached to the carrier strip 36 closer to the loop end 38a leaving an open portion sufficient for the wire 66 to be fed through at the loop end 38a. Advantageously, the feed holes 40 are positioned inside each loop 38. After the loop 38 is attached under the clip of a chub package, the two-ply strip may be removed from the loop.

Figure 6:
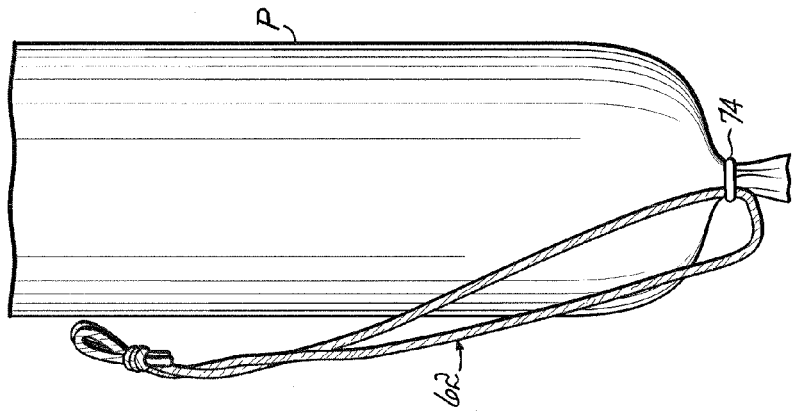
FIG. 6 depicts a loop captured by a metal clip secured to one end of a chub package.
Figure 5:
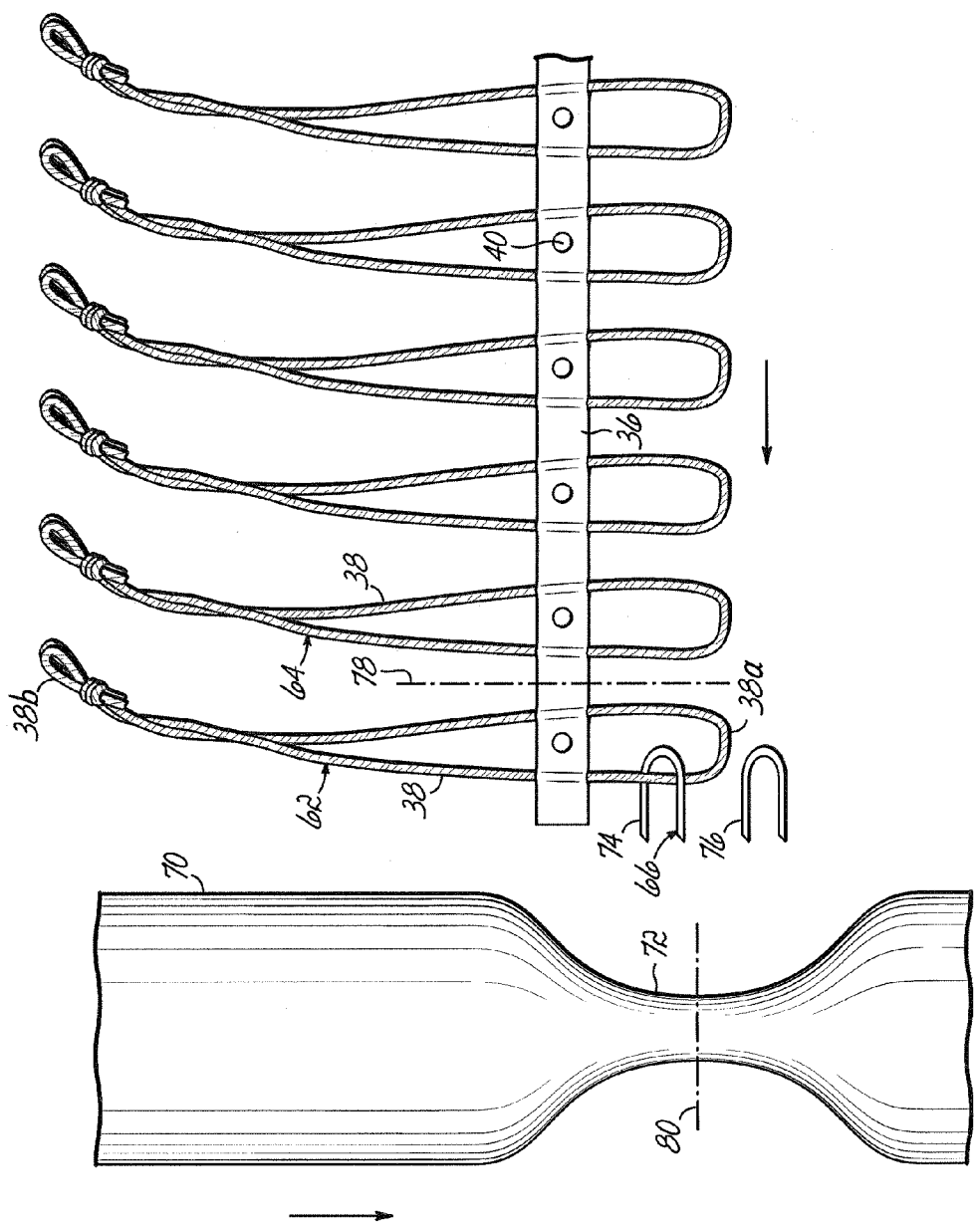
FIG. 5 depicts capture of the lead loop by a metal clip for attachment to a chub package in accordance with the method of the present invention.

As depicted in FIG. 5, as the filled tube 70 is fed continuously downward with a gathered void portion 72 formed by the voider 11 (see FIG. 1) positioned in the clipping head assembly 12 (see FIG. 1), the wire 66 of one of the metal clips 74, 76 is threaded through the opening at the loop end 38a of the lead loop 62 and the carrier strip 36 is cut along cut line 78 between lead loop 62 and the next successive loop 64 so as to release lead loop 62 from the carrier strip 36. A clip forming assembly (not shown) may be included to form and cut a straight wire 66 fed from a wire spool (not shown) into a U-shaped clip 74 before or after, advantageously after, wire 66 is threaded through the loop end 38a, or wire 66 may be in the form of a preformed U-shaped clip delivered to the clipping head assembly 12 prior to capturing the lead loop 62. The clip 74 with the lead loop 62 captured thereby is then clipped around the void portion 72 of the tube 70 to clip off the tube with the loop 62 attached under the clip 74, as shown in FIG. 6. The tube material is severed at cut line 80 between the two metal clips 74, 76 to form opposing ends of two chub packages P.

In operation, and in reference to FIGS. 1-6, the method of the present invention includes mounting a roll of loops 34 on a shaft 32 and feeding the carrier strip 36 through a guide mechanism 44 and into mesh with the pins 58 of the drive sprocket 46. The feed holes 40 on the carrier strip 36 allow positive registered feed via sensor pick-up of the drive pins 58 by sensor 52. The lead loop 62 on the carrier strip 36 is fed through the cutting knife assembly to a registered position at the clipping head assembly 12. The lead loop 62 may be overfed past the registered position, and then reversed to return to the registered position to ensure the loop is open. A pair of wires 66 from wire spools are then fed to the clipping head assembly 12 and one of the wires 66 is threaded through the opening of the lead loop 62. The carrier strip 36 is cut to release the lead loop 62 and the pair of wires 66 are cut. The severed wires are shaped into U-shaped clips 74, 76 with one of the clips 74 having the loop 62 captured thereby. While the carrier strip 36 is being fed and the lead loop 62 is being captured, a packaging film 14 is being formed into a tube, fed through the chub machine 5, and filled with flowable material to form filled tube 70. The voider 11 creates void sections 72 intermittently along the tube 70 and each void section 72 is sequentially placed in the clipping head assembly 12. Gathering plates (not shown) sequentially gather each void section 72 therebetween and the clips 74, 76 and captured loop 62 are transferred to the section 72 in spaced relation and cinched around the section 72 so as to close off the tube 70. The cinching action permanently attaches the lead loop 62 under the clip 74 at the end of the chub package P. The tube 70 is then severed between clips 74 and 76, allowing one completed chub package to fall free. In an alternative embodiment, the wire feed, wire cutting and U-shaped clip-forming steps are replaced with the feeding of preformed U-shaped clips 74, 76 to the clipping head assembly 12 with one of the clips 74 capturing the lead loop 62 prior to transfer to the section 72 for cinching.

After the tube 70 is severed, the next void section 72 is fed to the clipping head assembly 12, the drive sprocket 46 is rotated until the next drive pin 58 is sensed, the next spaced loop 64 becomes the lead loop 62, which is then threaded by wire 66, and the next pair of wire clips 74, 76 and captured loop 62 are transferred to the section 72 to be cinched. The process continues in this registered fashion until the sensor senses the end of the roll 34, or until another feed is depleted, such as the film feed, the product feed, the wire feed, or the preformed clip feed, or until a controller signals the cycle to stop. It may be appreciated that the various operations of the chub machine, as well as the loop attachment apparatus, may be implemented with any of various types of variable speed drive motors. While a servomotor has been described in the embodiments herein, the various components, including pump 9, film drive 10, clipping head 12, and drive sprocket 46, may also be operated by variable frequency drive motors, variable pulley drive motors, variable speed dc drive motors or any other type of variable speed drive motor. These components may be operated by the same type of motor or they may each have different types of motors. The drive motors are advantageously each controlled, for example by a PLC.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A method for attaching a loop to a chub package, the method comprising the steps of:

feeding a packaging tube;
   feeding a flowable material into the packaging tube;
   intermittently forming short lengths of tube void of product;
   feeding the tube containing the flowable material through a vertically reciprocating clipping head assembly to sequentially position each short length between opposing sets of gathering plates carried on horizontally reciprocating support cams and sequentially gathering the short lengths of the tube therebetween;
   feeding a carrier strip having a plurality of spaced feed holes and a plurality of loops attached to the carrier strip with each loop positioned in correlation with a respective feed hole from a mounted roll to a drive sprocket that is driven by a variable speed drive motor, the drive sprocket having a plurality of spaced drive pins for engaging the carrier strip, and then feeding the carrier strip to the clipping head assembly in registered motion to position a lead loop sequentially in a registered position;
   feeding a pair of wires to the clipping head assembly in spaced relation and sequentially threading one of the wires through each lead loop in the registered position;
   sequentially cutting the pair of wires and wrapping each pair of cut wires around a respective short length to form a pair of spaced wire clips for closing the tube and sequentially cutting the carrier strip between each lead loop and a next spaced loop to release each lead loop from the roll whereby each lead loop is captured by one of the pair of spaced wire clips; and
   severing each short length between the spaced wire clips.

2. The method of claim 1 further comprising detecting each drive pin sequentially with a sensor and feeding a detection signal to a controller to drive the feed of the carrier strip in registered motion.

3. The method of claim 2 further comprising sensing an end of the roll and signaling the controller to stop the steps.

4. The method of claim 1 further comprising feeding the carrier strip in registered motion to advance the lead loop forward to an over-fed position past the registered position and then reversing the feed to return the lead loop backward to the registered position to be threaded by the wire.

5. A method for attaching a loop to a chub package, the method comprising the steps of:

feeding a packaging tube;
   feeding a flowable material into the packaging tube;
   intermittently forming short lengths of tube void of product;
   feeding the tube containing the flowable material through a clipping head assembly to sequentially position each short length between opposing sets of gathering plates carried on horizontally reciprocating support cams and sequentially gathering the short lengths of the tube therebetween;
   feeding a carrier strip having a plurality of spaced feed holes and a plurality of loops attached to the carrier strip with each loop positioned in correlation with a respective feed hole from a mounted roll to a drive sprocket that is driven by a variable speed drive motor, the drive sprocket having a plurality of spaced drive pins for engaging the carrier strip, and then feeding the carrier strip to the clipping head assembly in registered motion to position a lead loop sequentially in a registered position;
   feeding a pair of preformed wire clips to the clipping head assembly in spaced relation and sequentially threading one of the wire clips through each lead loop in the registered position;
   sequentially attaching each pair of spaced wire clips around a respective short length to close the tube and sequentially cutting the carrier strip between each lead loop and a next spaced loop to release each lead loop from the roll whereby each lead loop is captured by one of the pair of spaced wire clips; and
   severing each short length between the spaced wire clips.

6. The method of claim 5 further comprising detecting each drive pin sequentially with a sensor and feeding a detection signal to a controller to drive the feed of the carrier strip in registered motion.

7. The method of claim 6 further comprising sensing an end of the roll and signaling the controller to stop the steps.

8. The method of claim 5 further comprising feeding the carrier strip in registered motion to advance the lead loop forward to an over-fed position past the registered position and then reversing the feed to return the lead loop backward to the registered position to be threaded by the wire clip.

* * * * *